United States Patent
McBrien et al.

(10) Patent No.: US 6,483,953 B1
(45) Date of Patent: Nov. 19, 2002

(54) EXTERNAL OPTICAL MODULATION USING NON-CO-LINEAR COMPENSATION NETWORKS

(75) Inventors: Gregory J. McBrien, Cromwell, CT (US); Karl M. Kissa, Simsbury, CT (US); Ed Wooten, Windsor, CT (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/309,444

(22) Filed: May 11, 1999

(51) Int. Cl.$^7$ .............................. G02F 1/035; G02B 6/10
(52) U.S. Cl. ................................................ 385/2; 385/3
(58) Field of Search .......................... 385/1–3; 359/245, 359/248, 254, 276

(56) References Cited

U.S. PATENT DOCUMENTS

| | | | |
|---|---|---|---|
| 4,448,479 A | | 5/1984 | Alferness ................... 350/96.14 |
| 4,468,086 A | * | 8/1984 | Liu ........................... 350/96.14 |
| 4,553,810 A | * | 11/1985 | Alferness et al. ........... 350/96.4 |
| 4,843,350 A | | 6/1989 | Nazarathy et al. .......... 332/7.51 |
| 5,091,981 A | * | 2/1992 | Cunningham ................... 385/3 |
| 5,138,480 A | | 8/1992 | Dolfi et al. .................. 359/251 |
| 5,291,565 A | | 3/1994 | Schaffner et al. ............... 385/3 |
| 5,680,497 A | | 10/1997 | Seino et al. ................. 385/129 |

FOREIGN PATENT DOCUMENTS

| | | | |
|---|---|---|---|
| EP | 0 340 043 | 11/1989 | .............. G02F/1/03 |
| EP | 0 629 892 A2 | 12/1994 | ........... G02F/1/035 |
| GB | 2138587 A | 10/1984 | .............. G02F/1/03 |

OTHER PUBLICATIONS

J.H. Schaffner et al., "Velocity–Matching in Millimeter Wave Integrated Optic Modulators with Periodic Electrodes" *J. Lightwave Tech.* 12(3):503–511 (1994).

F. Rahmatian et al., "An Ultrahigh–Speed AlGaAs–GaAs Polarization Converter Using Slow–Wave Coplanar Electrodes" *IEEE Photonics Techn. Letters* 10(5):675–677 (1998).

F.T. Sheehy et al., "60 GHz and 94 GHz Antenna–Coupled LiNbO$_3$ Electrooptic Modulators" *IEEE Photonics Tech. Letters* 5(3):307–310 (1993).

C.D. Watson et al., "Proposal for a 94–GHz Phase–Reversal Optical Modulator Using a Loaded Transmission Line" *IEEE Photonics Tech. Letters* 9(1):52–54 (1997).

R.C. Alferness et al., "Velocit y–Matching Techniques for Integrated Optic Traveling Wave Switch/Modulators" *IEEE Journal of Quantum Electronics QE–20*(3):301–309 (1984).

International Search Report dated Dec. 4, 2000 in corresponding PCT Application No. PCT/US00/12397.

* cited by examiner

*Primary Examiner*—Frank G. Font
*Assistant Examiner*—Michael P. Mooney
(74) *Attorney, Agent, or Firm*—Kurt Rauschenbach; Rauschenbach Patent Law Group

(57) ABSTRACT

An electro-optic device including an optical waveguide formed in an electro-optic material that propagates an optical signal along a first direction of propagation is described. The device also includes an electrical waveguide formed in the electro-optic material and positioned co-linear relative to the optical waveguide and in electromagnetic communication with the optical waveguide, where the electrical waveguide also propagates the electrical signal in the first direction of propagation. A compensation network is electrically coupled to the electrical waveguide at a junction and propagates the electrical signal in a second direction of propagation that is substantially non-co-linear with the first direction of propagation. In operation, the compensation network modifies at least one of a phase or an amplitude of the electrical signal at the junction relative to a phase or an amplitude of the accumulated modulation on the optical signal at the junction, respectively, and then returns the modified electrical signal to the electrical waveguide.

29 Claims, 9 Drawing Sheets

US 6,483,953 B1

EXTERNAL OPTICAL MODULATION USING NON-CO-LINEAR COMPENSATION NETWORKS

FIELD OF THE INVENTION

The invention relates generally to the field of optical modulation and, in particular, to methods and apparatus for high-speed external optical modulations.

BACKGROUND OF THE INVENTION

Optical modulators impress or modulate RF (or microwave) electrical signals onto a light beam in order to generate a modulated optical beam that carries data. Modulators either directly modulate the optical beam as it is generated at the optical source or externally modulate the optical beam after it has been generated. Direct modulation is typically accomplished by modulating the drive current of the optical source. An integrated electro-absorptive modulator can modulate the optical intensity of light leaving the source as well.

External modulation can be accomplished by using an external modulator that is separate from the optical source. External modulation is advantageous because it can modulate signals over a very wide bandwidth. External modulators are typically voltage-controlled devices that include a traveling-wave electrode structure, which is positioned in close proximity to the optical waveguide. The electrode structure produces an electric field that overlaps the optical waveguide over a predetermined distance (the interaction length) and causes an electromagnetic interaction which modulates the optical signal.

Lithium niobate (LN) electro-optic external modulators are increasingly being used to modulate data on optical signals that are being transmitted at very high data rates and over long distances. Lithium niobate modulators are advantageous because they can modulate optical signal over a broad frequency range, they modulate optical signals with minimal optical frequency shift (frequency "chirp"), and they operate over a broad wavelength range. These features are particularly desirable for Dense Wavelength Division Multiplexing (DWDM) broadband optical communication systems that transmit optical signals with many optical wavelengths through a single optical fiber.

Modulators used for transmission at high speeds and over long distances must be efficient to avoid the use of expensive electronic amplifiers and digital drivers. In addition, modulators need to be compact in order to minimize the required space on the transmitter card.

Lithium niobate crystals have an inherent mismatch between the velocity of optical and electrical signals propagating through the crystal which impacts modulation efficiency. The RF propagation index is significantly higher than the optical refractive index of lithium niobate. That is, the lithium niobate crystal slows the RF signal relative to the optical signal so that it takes the RF signal a longer period of time to travel over the interaction distance. Thus, the RF signal becomes out-of-phase with or "walks off" the optical signal. Consequently, the modulation becomes inefficient. The longer the interaction distance, the greater the inefficiency. Using a buffer layer can minimize velocity walk-off, however, the required interaction length is long.

FIG. 1 illustrates a top view of a prior art electro-optic device 10 that compensates for the velocity mismatch between the optical and electrical signals propagating through the device by using phase reversal sections that are co-linear with the optical waveguide. The device 10 includes an optical waveguide 12 and RF electrodes 14 that are positioned in zero degree phase sections 16 and in phase reversal sections 18. The phase reversal sections 18 periodically flip the RF electrodes 14 to either side of the optical waveguide 12 to produce a 180 degree phase shift in the RF signal relative to the optical signal. The RF electrodes 14 are positioned to alternate between the zero degree phase shift sections 16 and the 180 degree phase shift sections 18. The length of the zero degree phase shift sections 16 is chosen so that the RF signal "walks off" the optical signal approximately 180 degrees before it is flipped 180 degrees in the phase reversal sections 18.

FIG. 2 illustrates a top view of a prior art electro-optic device 30 that compensates for the velocity mismatch between the optical and electrical signals propagating through the device 30 by using co-linear but intermittent interaction sections. The device 30 includes an optical waveguide 32 and RF electrodes 34 that are positioned to alternate between an interaction region 36 and a non-interaction region 38 relative to the optical waveguide 32. The length of the interaction region 36 is chosen so that the RF signal "walks off" the optical signal by as much as 180 degrees of phase shift before it is routed away from the optical waveguide 32 in a co-linear direction and into the non-interaction region 38. The length of the non-interaction region 38 is chosen so that the RF signal becomes phase matched with the optical signal at the end of the non-interaction region 38.

One disadvantage of prior art electro-optic devices that compensate for the velocity mismatch between the optical and electrical signals propagating through the device is that they have relatively low modulation efficiency per unit length. This is because the phase of the RF signal is modified with co-linear sections that are positioned at intervals of 180 degrees. When the difference in phase between the RF and optical signals approaches 180 degrees, the incremental increase in modulation depth with incremental change in electrode length approaches zero. Therefore, the total length of the device must be increased in order to achieve the required modulation. Increasing the length of a lithium niobate device increases the size of the package containing it, which is undesirable, because of the limited space on the transmitter board. State-of-the-art DWDM systems have stringent space requirements due to their high channel count. In addition, more expensive and larger power supplies must be used because higher drive voltages are required.

SUMMARY OF THE INVENTION

It is therefore a principal object of this invention to provide an electro-optic device that includes a compensation network that modifies at least one of the phase or the amplitude of the electrical signal relative to the phase or amplitude of the accumulated modulation on the optical signal without introducing significant loss or decreasing the modulation efficiency. It is another principle object for such a compensation network to compensate for velocity mismatch between the electrical signal and the optical signal. It is another principle object for such a compensation network to compensate for the effects of external perturbations in the substrate of the modulator, such as the effects of temperature on a lithium niobate substrate. It is another principle object for such a compensation network to be removably attached to the device to facilitate modifying the frequency response of the device. It is yet another principle object of the present invention to construct a modulator with such a compensation network that is used in conjunction with prior art broadband modulator to form a combined modulator that is capable of producing bandwidth extension of the broadband modulator into the narrow band modulator region.

A principal discovery of the present invention is that an electro-optic device can be constructed with a compensation network that temporarily directs the electrical signal in a path that is in a non-co-linear direction relative to the direction of propagation of the optical signal and that such a compensation network has numerous advantages over the prior art. For example, such a compensation network can modify the phase of the electrical signal relative to the optical signal in order to minimize the effects of velocity mismatch, while introducing very low loss. Such a compensation network can also compensate for the effects of external perturbations on the electro-optic device. In one embodiment of the invention, such a compensation network is used to construct a modulator that provides more efficient modulation per unit length of electrode.

Accordingly, the present invention features an electro-optic device that includes an optical waveguide that is formed in an electro-optic material such as lithium niobate. The optical waveguide propagates an optical signal along a first direction of propagation. An electrical waveguide is also formed in the electro-optic material and is positioned co-linear relative to the optical waveguide and in electromagnetic communication with the optical waveguide. The electrical waveguide also propagates an electrical signal in the first direction of propagation.

In addition, the electro-optic device includes a compensation network that is electrically coupled to the electrical waveguide at a junction. The compensation network propagates the electrical signal in a second direction of propagation that is substantially non-co-linear with the first direction of propagation. In one embodiment, the compensation network includes at least one of an all-pass electrical network, an inductor-capacitor "Pi" network, traveling wave coupler, filter, and transmission line transformer.

The compensation network is designed to modify at least one of the phase or the amplitude of the electrical signal at the junction relative to the phase or the amplitude of the accumulated modulation on the optical signal at the junction, respectively, and then return the modified electrical signal to the electrical waveguide. The compensation network may be a time delay network or a phase delay network.

In one embodiment, the compensation network is a phase delay network that modifies the phase of the electrical signal so that an electro-optic response of the device is increased. In another embodiment, the compensation network is a phase delay network that modifies the phase of the electrical signal so that an electro-optic phase at the junction is substantially equal to an electro-optic phase at an input of the electrical waveguide.

In yet another embodiment, the compensation network is a phase delay network that modifies the phase of the electrical signal at the junction relative to the phase of the accumulated modulation on the optical signal at the junction by a predetermined delay that is variable over a range from zero to one hundred and eighty degrees. In this embodiment, the phase of the electrical signal at the junction relative to the phase of the accumulated modulation on the optical signal at the junction may be modified to be substantially one hundred and eighty degrees.

One advantage of the compensation network of the present invention is that the electrical loss per unit length can be designed to be significantly lower than the electrical loss per unit length of the electrical waveguide to minimize RF losses. Another advantage of the compensation network is that it may be removably attached to the electro-optic device so that it can be replaced by another compensation network with different characteristics. Another advantage of the compensation network is the temperature dependence of the compensation network can be made to be inversely proportional to the temperature dependence of the electro-optic material so as to compensate for temperature non-linearity in the electro-optic material.

The present invention also features an electro-optic modulator that includes a plurality of compensation networks. The optical waveguide is formed in an electro-optic material such as lithium niobate. The optical waveguide propagates an optical signal along a first direction of propagation. An electrical waveguide is formed in the electro-optic material and is positioned in a co-linear direction relative to the optical waveguide and in electromagnetic communication with the optical waveguide. The electrical waveguide also propagates an electrical signal in the first direction of propagation. Each of the plurality of compensation networks are electrically coupled to the electrical waveguide at one of a plurality of junctions. Each of the compensation networks propagates the electrical signal in a second direction of propagation that is substantially non-co-linear with the first direction of propagation.

In operation, each of the plurality of compensation networks modifies a phase of the electrical signal at a respective junction of the plurality of junctions relative to a phase of the accumulated modulation on the optical signal at the respective junction by a predetermined delay and then returns the modified electrical signal to the electrical waveguide. The predetermined delay is variable over a range from zero to one hundred and eighty degrees and, in one embodiment of the invention, the predetermined delay is substantially one hundred and eighty degrees. In another embodiment, each compensation network modifies the phase of the electrical signal at the respective junction relative to the phase of the accumulated modulation on the optical signal at the respective junction so that an electro-optic response of the device is increased.

BRIEF DESCRIPTION OF THE DRAWINGS

This invention is described with particularity in the appended claims. The above and further advantages of this invention may be better understood by referring to the following description taken in conjunction with the accompanying drawings, in which:

DETAILED DESCRIPTION

Figure 3:
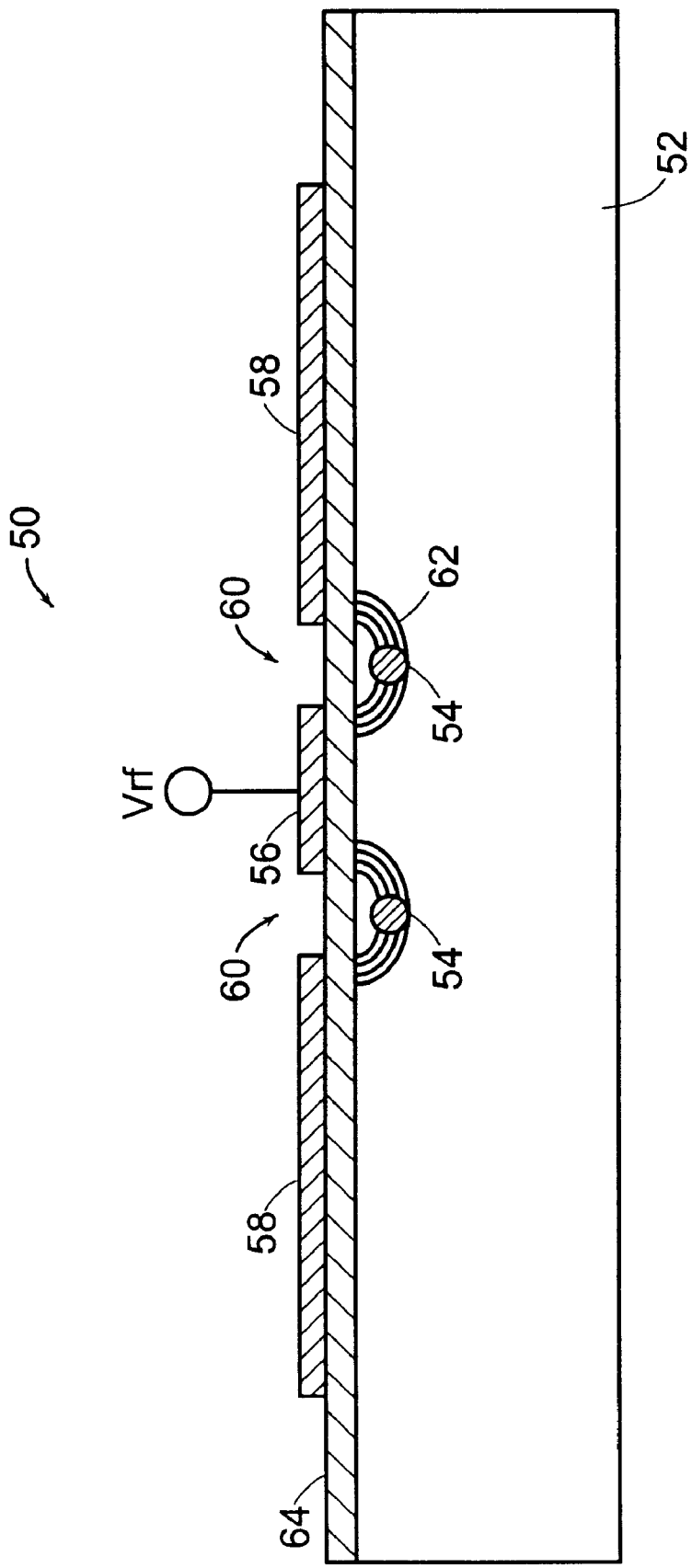
FIG. 3 illustrates an electrode cross-section of a prior art traveling wave electro-optical device where the optical and electrical signals propagate in an entirely co-linear path.

FIG. 3 illustrates an electrode cross-section of a prior art traveling wave electro-optical device 50 where the optical and electrical signals propagate in an entirely co-linear path. The substrate 52 is formed of an electro-optic material such as lithium niobate ($LiNbO_3$). Many prior art devices use X-cut $LiNbO_3$ substrates. The device includes optical waveguides 54 that are positioned entirely within the substrate 52. The optical waveguides 54 may be formed by diffusing titanium into the $LiNbO_3$ substrate 52. Electrical waveguides are positioned in a co-planar waveguide (CPW) geometry with a hot electrode 56 positioned in the center of the CPW structure and ground electrodes 58 positioned adjacent to both sides of the hot electrode 56. The ground electrodes 58 are spaced apart from the hot electrode by a gap 60. Typical prior art device lengths are on order of 20 mm.

Optical and electrical modulation signals propagate along the optical 54 and electrical waveguides 56, 58, respectively, into the plane of the page. The electrical modulation signal generates an electric field 62 that travels from the hot electrode 56 to the ground electrodes 58. It is desirable to minimize the required amplitude of the electrical modulation signal. The gap 60 is typically chosen to be small in order to maximize the electromagnetic interaction of the electrical waveguides 56, 58 with the optical waveguides 54 and thus minimize the amplitude of the required electrical modulation signal.

The required amplitude of the electrical modulation signal is determined by the switching voltage-length product (Vpi-L) of the device which is a function of both the electrode geometry and the degree of overlap between the electric field 62 and the optical signal. Vpi-L of typically prior art devices is typically 40 to 50 Volt-mm for the CPW structure shown in FIG. 3. Thus for a device with 20 mm long electrodes, the required electrical modulation signal is approximately 2 volts.

A disadvantage of the prior art device 50 is that at high modulation frequencies, RF losses become significant. Typical RF losses range from about 0.5 to 1 dB/Sqrt(GHz)-cm for $LiNbO_3$. Consequently, the electromagnetic interaction of the electrical waveguides 56, 58 with the optical waveguides 54 decreases at high frequency thereby increasing the Vpi-L and thus, the required amplitude of the electrical modulation signal.

Another disadvantage of prior art devices is that the velocities of the optical signal and the electrical modulation signal are different. The velocity of the electrical modulation signal is determined by the RF propagation index, which may be as high as 3.5 to 4.0. The velocity of the optical signal is determined by the optical propagation index, which is approximately 2.1 for $LiNbO_3$. The difference in the RF index and the optical propagation index results in a significant velocity mismatch of the optical and the electrical modulation signals. This velocity mismatch results in the optical signal becoming out-of-phase with the electrical modulation signal thereby reducing or canceling the accumulated modulation, and increasing the amplitude of the required electrical modulation signal.

Some prior art devices include a buffer layer 64 that is positioned between the electrodes 56, 58 and the substrate 52 that has a lower refractive index than the substrate 52. Using the buffer layer 64 lowers the RF index because the buffer layer 64 together with the substrate 52 presents an average effective RF index that is somewhere between the refractive index of the buffer layer 64 and the RF index. Using a buffer layer, however, degrades the efficiency of the device because the electric field must penetrate a longer path and thus is reduced in magnitude.

Figure 4:
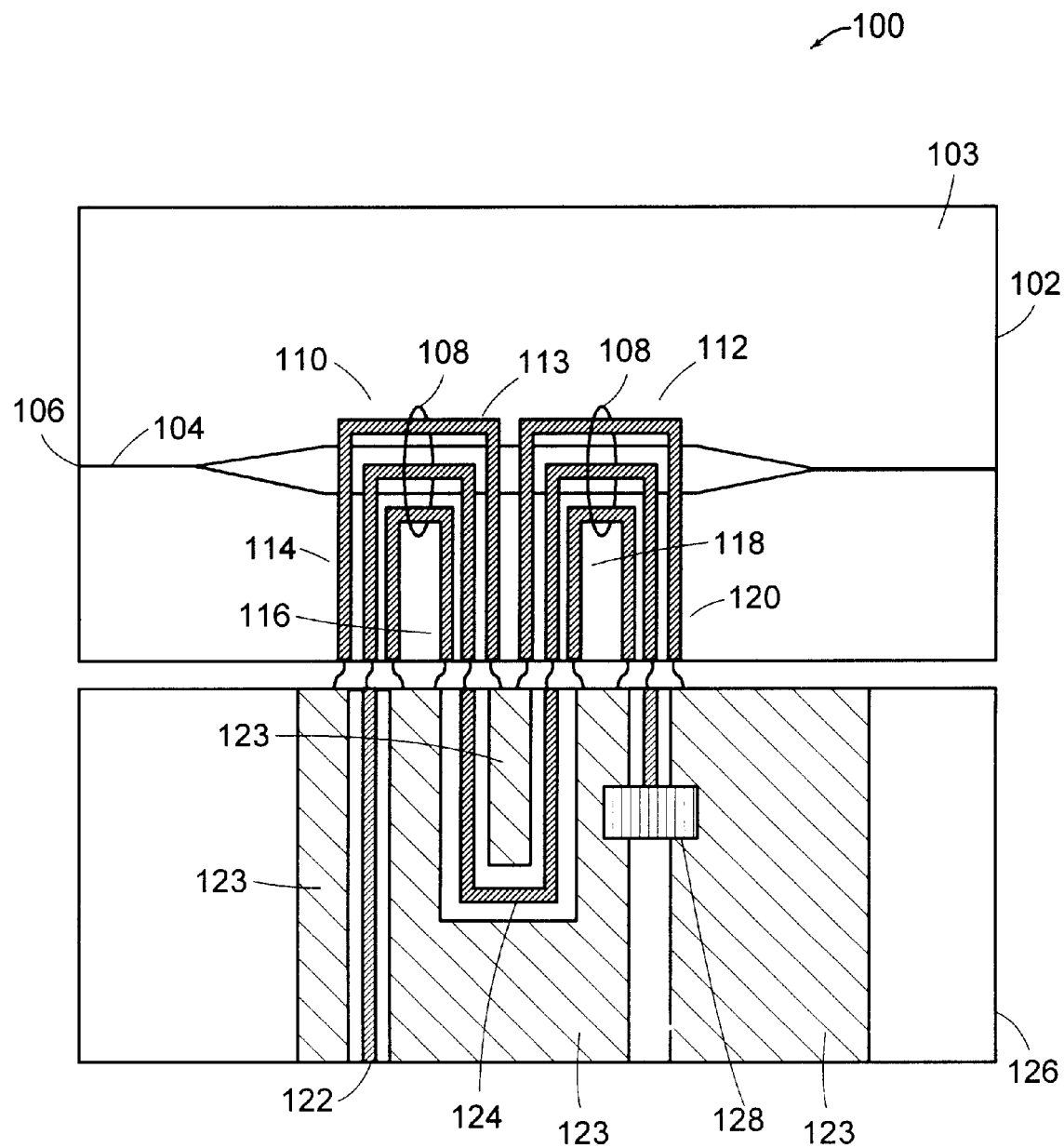
FIG. 4 illustrates a top view of a segmented electro-optic device according to the present invention that includes a compensation network where the electrical signal propagates in a non-co-linear path relative to the optical signal.

FIG. 4 illustrates a top view of a segmented electro-optic device 100 of the present invention. The device includes an electro-optic AM modulator 102 that is formed on an electro-optic substrate 103, which in one embodiment is a $LiNbO_3$ substrate. Optical waveguides 104 are formed in the substrate as described in connection with FIG. 3 or by numerous other techniques known in the art. An optical signal input 106 of the optical waveguides 104 is positioned to receive an incident optical beam. The optical waveguides 104 split into two paths.

The modulator 102 includes electrical co-planar waveguides 108 that propagate the electrical modulation signal along hot and ground electrodes as described in connection with FIG. 3. The waveguides 108 have a first 110 and a second co-linear section 112 where the electrical modulator signal propagates in a co-linear direction relative to the optical signal. The first co-linear section 110 ends at a compensation point 113.

In one embodiment of the present invention, the length of the first and second co-linear sections is chosen to be approximately the length where the velocity mismatch between the electrical modulation signal and the optical signal causes a significant degradation in the incremental change in modulation efficiency with additional electrode length. In another embodiment of the present invention, the length of the first and second co-linear sections is chosen to be approximately the length were the velocity mismatch between the electrical modulation signal and the optical signal is such that the electrical modulation signal is one hundred and eighty degrees out-of-phase relative to the phase of the accumulated modulation on the optical signal.

The waveguides 108 also have a first 114, second 116, third 118, and fourth non-co-linear section 120 where the electrical modulator signal propagates in a non-co-linear direction relative to the optical signal. A modulation signal input waveguide 122 with ground electrodes 123 is electrically coupled to the first non-co-linear section 114. The modulation signal input waveguide 122 may be positioned on a separate substrate as shown in FIG. 4 or on the modulator substrate 103.

The electro-optic device 100 also includes a compensation network 124 that is coupled to the compensation point 113 by the second non-co-linear section 116. The compensation network 124 can be designed to provide any type of frequency response. In one embodiment of the present invention, the compensation network 124 is designed so that its frequency response increases the modulation efficiency.

The compensation network can be implemented by numerous traveling wave and lumped element structures known in the art such as an inductor-capacitor "Pi" network, traveling wave coupler, filter, and a transmission line transformer. In one embodiment, the compensation network 124 comprises a phase delay section that has a length which delays the phase of the electrical modulation signal relative to the phase of the accumulated modulation on the optical signal.

In one embodiment of the present invention, the compensation network 124 is designed to generate frequency response characteristics that vary with at least one external perturbation in a manor that compensates for such perturbation. For example, the compensation network 124 may be designed to generate frequency response characteristics that vary with temperature in such a way as to compensate for the effect of temperature variations in the modulator substrate 103. This can be done by varying the physical length, dielectric constant, or other parameters of the compensation network.

In one embodiment of the present invention, the compensation network 124 is positioned on a substrate 126 that is separate from the modulator 102 and is removably attached to the modulator 102. Such a feature allows an electro-optic device to be easily reconfigured. For example, a modulator of the present invention may be used in an optical communication system with variable bandwidth. In such a system, the bandwidth can easily be changed by replacing the compensation network with one having the desired frequency response.

One advantage of the present invention is that the electrode geometry of the compensation network 124 can be designed to provide much lower loss compared with the electrical co-planar waveguides 108 of the modulator 102. That is, the electrodes comprising the compensation network 124 can be constructed with wider conductors that have relatively low resistive losses and wider gaps between the conductors which reduce skin effect losses. In addition, the compensation network 124 may be formed on a low-loss substrate that is separate from modulator 102. In one embodiment, the input waveguide 122 and the compensation network 124 are formed on a ceramic substrate to reduce RF losses.

In one embodiment of the present invention, the electrical co-planar waveguides 108 of the modulator 102 are terminated in a matched impedance 128 that is attached to the end of the fourth non-co-linear section 120. Terminating the electrical waveguides 108 will eliminate or reduce reflections, which increase the RF signal returned to the RF signal generator connected to input 122. In the embodiment illustrated in FIG. 4, the matched impedance 128 is a chip resistor that is attached to substrate 126.

In another embodiment, the compensation network 124 is formed directly on modulator substrate 103. In one embodiment, the compensation networks are fabricated on lithium niobate substrates that may be formed directly on the modulator substrate 103 or may be formed on a separate lithium niobate substrate. Fabricating the compensation network 124 on a lithium niobate substrate is advantageous because lithium niobate is less susceptible to parasitic effects, such as parasitic coupling to the package (not shown). In one embodiment where the compensation networks are fabricated on lithium niobate substrates, the width of the hot electrodes within the compensation network is 100 microns or less. Also, in one embodiment, the ground electrodes at the input are isolated from those at the output, in order to prevent ground currents from taking a path that bypasses the delay line.

In another embodiment of the invention, the electro-optic device illustrated in FIG. 4 is used in conjunction with a prior art device such as the device illustrated in connection with FIG. 3. Such a combination results in a combined narrow band and broadband modulator that can be used to produce bandwidth extension of the broadband modulator into the narrow band modulator region.

In operation, an optical signal is coupled to the optical signal input 106 of the optical waveguides 104 and an electrical modulation signal is coupled to the modulation signal input waveguide 122. The optical signal propagates along the optical waveguides 104. The electrical modulation signal propagates along the first non-co-linear section 114 of the electrical co-planar waveguides 108 until it merges with the first co-linear section 110 of waveguides 108. The electrical modulation signal then propagates along the first co-linear section 110 where the electrical modulation signal electromagnetically interacts with the optical signal, thereby modulating the optical signal.

The electrical modulation signal is then directed away from the optical waveguides 108 at the compensation point 113 to the second non-co-linear section 116 of the electrical co-planar waveguides 108, which directs the electrical modulation signal into the compensation network 124. The compensation network 124 modifies at least one of the amplitude or phase of the electrical modulation signal relative to the amplitude or phase of the accumulated modulation on the optical signal, respectively, and then returns the compensated modulation signal to the third non-co-linear section 118 of the electrical co-planar waveguides 108. The modulated optical signal is then detected by and optical detector (not shown) and then demodulated by a demodulator (not shown).

The compensated electrical modulation signal propagating on the third non-co-linear section 118 of waveguides 108 merges with the second co-linear section 112 of waveguides 108. The compensated modulation signal then propagates along the second co-linear section 112 where the compensated modulator signal electromagnetically interacts with the optical signal, thereby modulating the optical signal.

In one embodiment, the phase of the electrical modulation signal is modified so that the electro-optic response of the modulator is increased. By electro-optic response, we mean the ratio of the magnitude and phase of the detected output voltage of the modulator to the magnitude and phase of the RF modulation signal. The electro-optic response represents the accumulated modulation on the optical signal for either a section of the modulator, or the entire modulator. The electro-optic response of a prior art non-velocity matched modulator and a modulator according to the present invention are vectorially illustrated below.

Figure 5C:
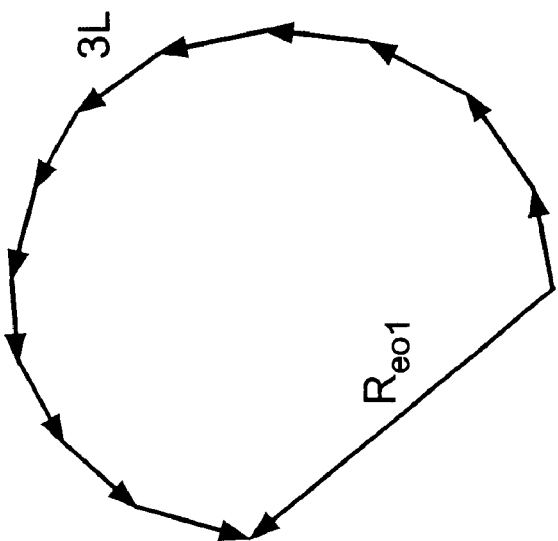
FIGS. 5a–c illustrate vectorial representations of the electro-optic response of a prior art non-velocity matched modulator having three electrode lengths: L; 2L; and 3L, respectively.
Figure 5B:
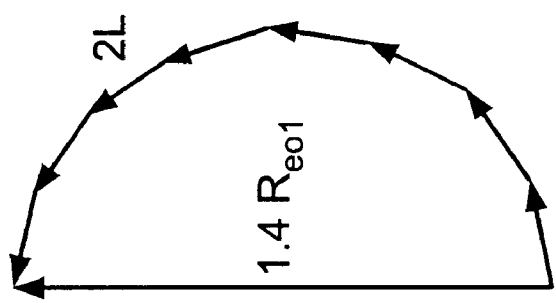
Figure 5A:
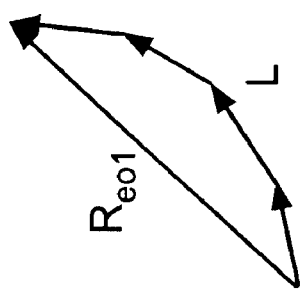

FIGS. 5a–c illustrate vectorial representations of the electro-optic response of a prior art non-velocity matched modulator having three electrode lengths: L; 2L; and 3L, respectively. The magnitude of the vector represents the strength of the modulation and the phase of the vector represents the phase relationship between the input RF modulation signal and the detected output voltage on a photodetector. The electro-optic response vector, $R_{eo}$, is defined as the ratio of the voltage generated by a photodetector that detects the modulated optical signal to the RF modulation voltage.

Assuming negligible RF losses, the magnitude of the electro-optic response for each segment of the modulator is the same. However, the phase of the electro-optic response (electro-optic phase), which is the RF phase of the accumulated modulation for each segment, changes. This is because of a mismatch in velocity between the optical signal and the propagating RF signal. That is, the RF signal travels slower than the optical mode, therefore, the electro-optic phase change is represented by a counter-clockwise rotation of the vector for each individual segment. The greater the frequency and/or the greater the velocity mismatch, the quicker the rotation of the phase. Because of the velocity mismatch, the resultant vector $R_{eo}$ has a magnitude that is less than the sum of the magnitudes of the individual vectors.

The magnitude of the response for an electrode length of 2L (FIG. 5b) and 3L (FIG. 5c) is normalized to the magnitude of the response for an electrode length of L (FIG. 5a). FIG. 5b illustrates that the electro-optic phase changes by 180° after 2L of electrode length. The total electro-optic response of the modulator having an electrode length of 2L is only 40% larger than the response of the modulator having an electrode length of L, even though the modulator is twice as long.

FIG. 5c illustrates that the electro-optic phase changes by 270° after 3L of electrode length. The total electro-optic response of the modulator having an electrode length of 3L actually reduces the total electro-optic response to the same magnitude as a modulator with an electrode length of L (FIG. 3a). If the length of the modulator were increased to 4L (not shown), the electro-optic response would be a null response because the individual vectors trace out a circle for the lossless modulator illustrated in FIG. 5. The vectors would follow a spiral-like path for a modulator that included RF loss.

Figure 6:
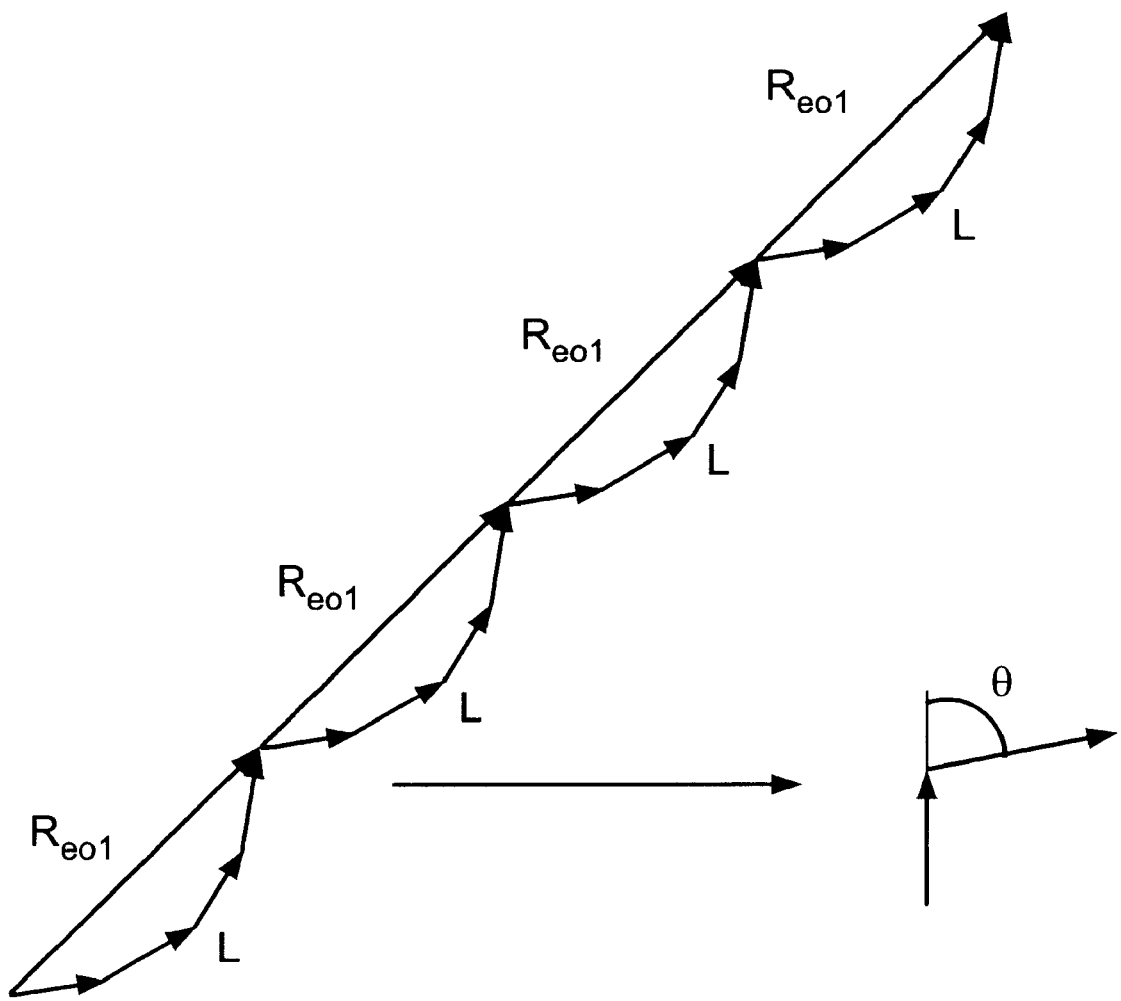
FIG. 6 illustrates a vectorial representation of the electro-optic response of a non-velocity matched modulator of the present invention that modifies the modulation signal so that the electro-optic response of the modulator is increased.

FIG. 6 illustrates a vectorial representation of the electro-optic response of a non-velocity-matched modulator of the present invention that modifies the modulation signal so that the electro-optic response of the modulator is increased. The modulator illustrated in FIG. 6 has four segments of length L, separated by three compensation networks. Each of the three compensation networks align the electro-optic phase of each segment to achieve coherent addition of the electro-optic response vectors, thereby increasing the modulation.

For the example shown in FIG. 6, the electro-optic response is only allowed to change by 90° and then the compensation network changes the phase lead to θ as shown in the figure. In one embodiment of the invention, the compensation network comprises a time delay network that generates a phase lag having a magnitude that equal 360°−θ. For example, if θ=90°, then the time delay network generates 270° of phase lag. If the RF is reintroduced slightly downstream from the point from where it was taken, the actual RF phase delay would be chosen to be greater than 270°, in order to account for the extra transit time of the light.

Figure 1:
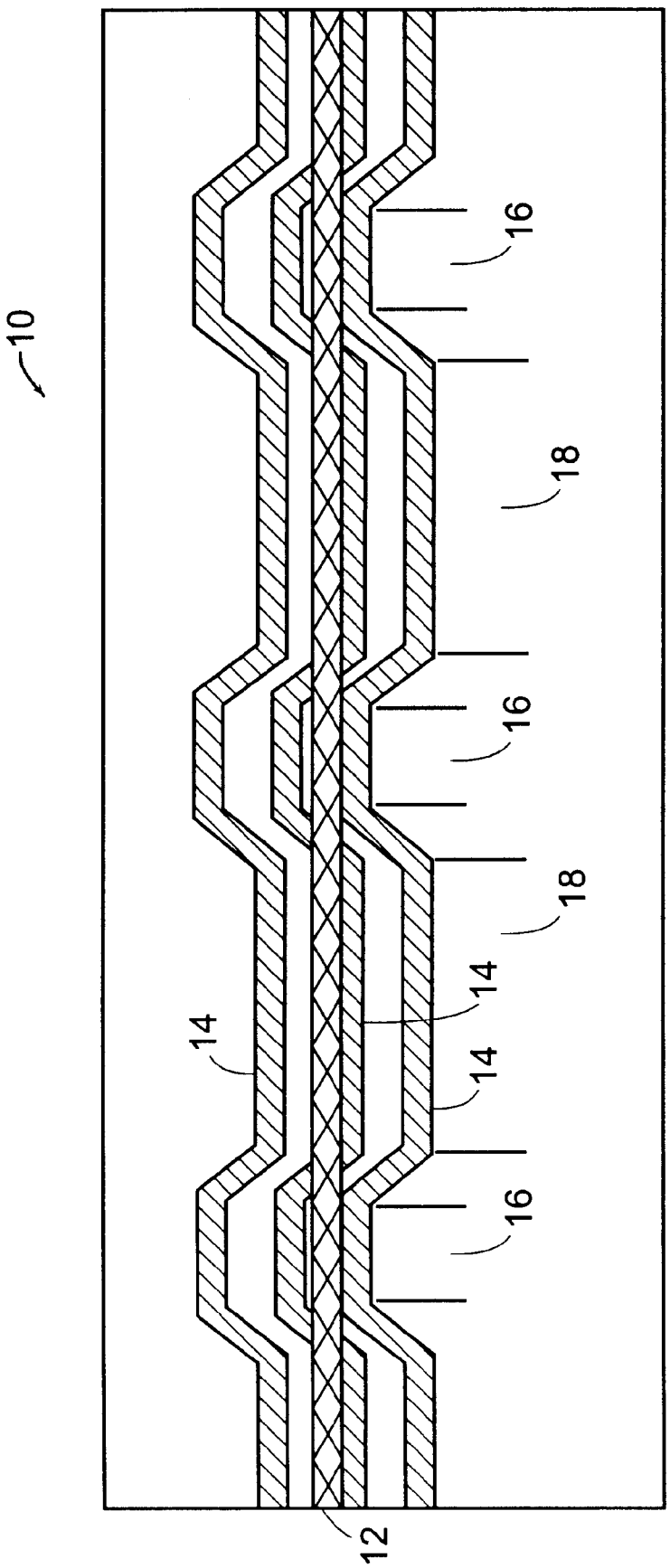
FIG. 1 illustrates a top view of a prior art electro-optic device that compensates for the velocity mismatch between the optical and electrical signals propagating through the device by using phase reversal sections that are co-linear with the optical waveguide.
Figure 2:
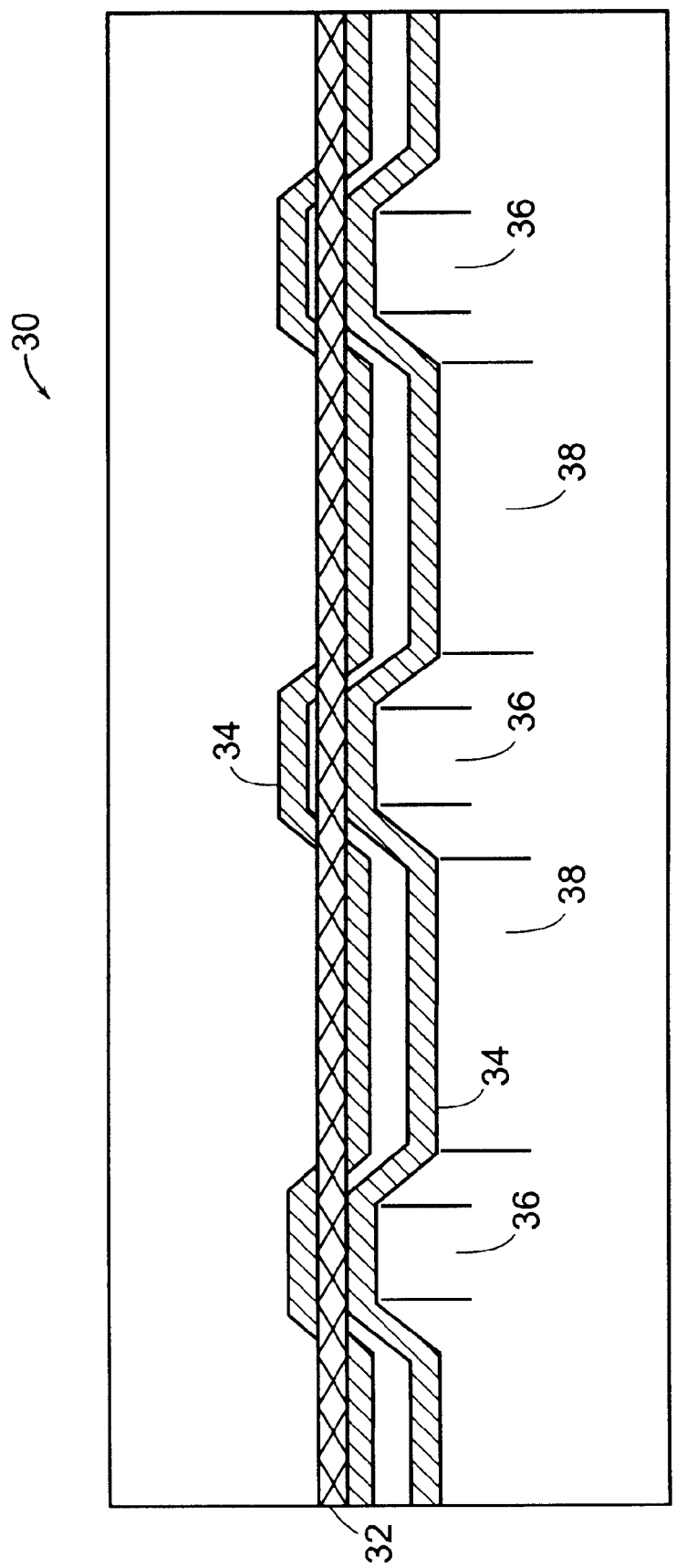
FIG. 2 illustrates a top view of a prior art electro-optic device that compensates for the velocity mismatch between the optical and electrical signals propagating through the device by using co-linear but intermittent interaction sections.

For the example illustrated in FIG. 6 of a non-velocity matched modulator of the present invention having four segments of length L, separated by three compensation networks that each introduce a phase delay of 270°, there is a significant increase in the total electro-optic response compared to the prior art. As described in connection with FIG. 5, a prior art modulator with an electrode length of 4L would have a null response. When compared to the prior art modulator described in connection with FIG. 1, where the phase reversal sections introduce an electro-optic phase change of 180°, the total electro-optic response of the modulator of FIG. 6 is approximately 40% larger. This increase in the electro-optic response would result in an increased in the detected RF power of approximately 3 dB.

Figure 7B:
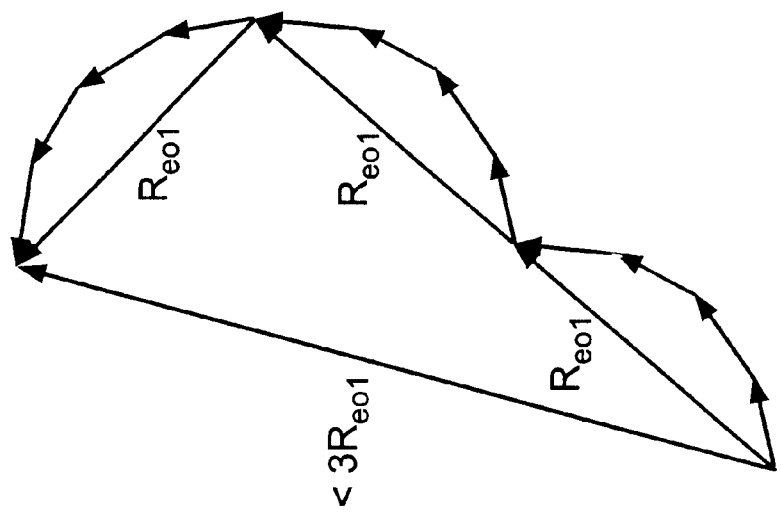
FIGS. 7a–b illustrate a vectorial representation of the electro-optic response of the modulator of the present invention having optimal and non-optimal modulation efficiency, respectively.
Figure 7A:
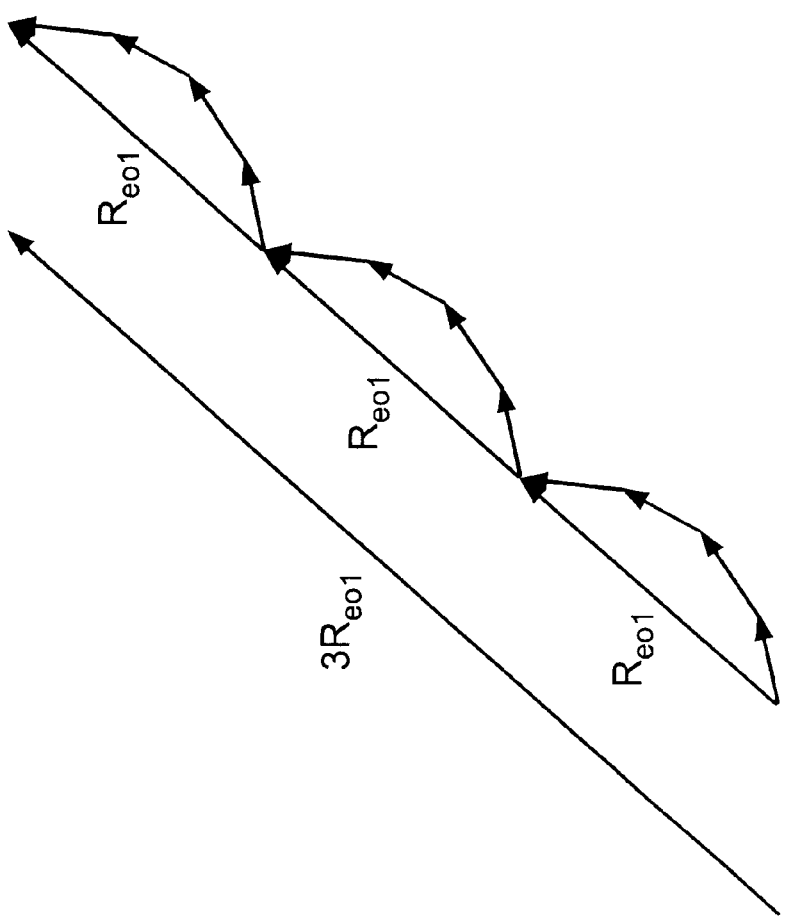

FIGS. 7a–b illustrate a vectorial representation of the electro-optic response of the modulator of the present invention having optimal and non-optimal modulation efficiency, respectively. FIG. 7a illustrates a non-velocity matched modulator of the present invention having three segments of length L, separated by two compensation networks that each introduce a phase delay of 270°.

FIG. 7b illustrates a non-velocity-matched modulator of the present invention having three segments of length L, separated by two compensation networks. The first compensation network introduces a phase delay of 270°. The second compensation network introduces a phase delay of almost 0° so that the electro-optic phase at the end of the third segment is not equal to the electro-optic phase at the beginning of the third section, thereby reducing the total electro-optic response.

Thus, in order to maximize the magnitude of the total electro-optic response of the modulator, the resultant vectors for each segment must be aligned, as shown in FIG. 7a. For the case of identical segments, the total electro-optic response of the modulator of the present invention is maximized when the compensation networks are designed to minimize the change in the electro-optic phase from the beginning of one segment to the beginning of another segment. That is, the compensation networks are designed to cause the electro-optic phase at the compensation point to be substantially the same as the electro-optic phase at the beginning of the segment. For the case of non-identical segments, the total response can be maximized by selecting the electro-optic phase to be a value different from the electro-optic phase at the beginning of the segment. However, alignment of the resultant vectors is still the criteria for maximizing electro-optic response.

Thus, the present invention features a method of modulating an optical signal using the electro-optic device of the present invention. An optical signal is propagated along an optical signal path in a first direction of propagation. An electrical modulation signal is also propagated along an electrical signal path in the first direction of propagation, where the electrical signal path is substantially co-linear and in electromagnetic communication with the optical signal path.

The electrical signal is then coupled into a substantially non-co-linear path at a compensation point of the electrical signal path. At least one of a phase or amplitude of the electrical signal at the compensation point of the electrical path is modified by propagating the electrical signal in the substantially non-co-linear path. The modified electrical signal is then coupled from the non-co-linear path back into the electrical signal path.

In one embodiment, the phase of the electrical signal is modified so that the magnitude of the electro-optic response of the modulator is increased. In one embodiment, the phase of the electrical signal is modified so that the electro-optic phase at the compensation point is the same as the electro-optic phase at the beginning of the electrode thereby maximizing the electro-optic response of the modulator.

The present invention also features a method of increasing modulation efficiency of a communication system. The method includes propagating an optical signal along an optical signal path in a first direction of propagation. An electrical modulation signal is propagated along an electrical signal path in the first direction of propagation, where the electrical signal path is substantially co-linear and in electromagnetic communication with the optical path.

The electrical signal is then coupled into a substantially non-co-linear path at a compensation point of the electrical path. The compensation point corresponds to a point where a velocity mismatch between the optical signal and the electrical signal produces a phase shift of the electrical signal relative to the accumulated modulation on the optical signal that lowers the incremental increase in modulation efficiency per unit length. The phase of the electrical signal at the compensation point of the electrical path is then modified by propagating the electrical signal in the substantially non-co-linear path thereby increasing the incremented modulation efficiency. The modified electrical signal is then coupled from the non-co-linear path back into the electrical path.

A modulator of the present invention that increases modulation efficiency by using a time delay compensation network also reduces the frequency range over which the modulator operates at near optimum efficiency. This is because the phase lag produced by the time delay is frequency dependent. For example, for a modulator of the present invention that includes compensation networks that comprise time delays, which are designed to maximize the total electro-optic response as described in connection with FIG. 7a, if the frequency of the RF modulation signal is changed so that the phase lead in the delay changes from 90° to 120°, the total electro-optic response is reduced by approximately 9%. The frequency dependence of the modulator of the present invention can be reduced by varying the amount of phase lag in the compensation networks between segments. Therefore, in one embodiment of the present invention, the amount of phase lag in each of the compensation networks between segments is chosen to maximize the electro-optic response for a particular bandwidth.

The present invention also features a method of broadband modulation of a communication system. The method includes propagating an optical signal along an optical signal path in a first direction of propagation. An electrical modulation signal is propagated along an electrical signal path in the first direction of propagation where the electrical signal path is substantially co-linear and in electromagnetic communication with the optical path.

The electrical signal is then coupled into a substantially non-co-linear path at a compensation point of the electrical path. The phase of the electrical signal at the compensation point of the electrical path is then modified by propagating the electrical signal in the substantially non-co-linear path. In one embodiment, the phase of the electrical signal is modified so that the electro-optic response is maximized for a particular bandwidth. The modified electrical signal is then coupled from the non-co-linear path back into the electrical path, thereby increasing the frequency response of the modulator.

Figure 8:
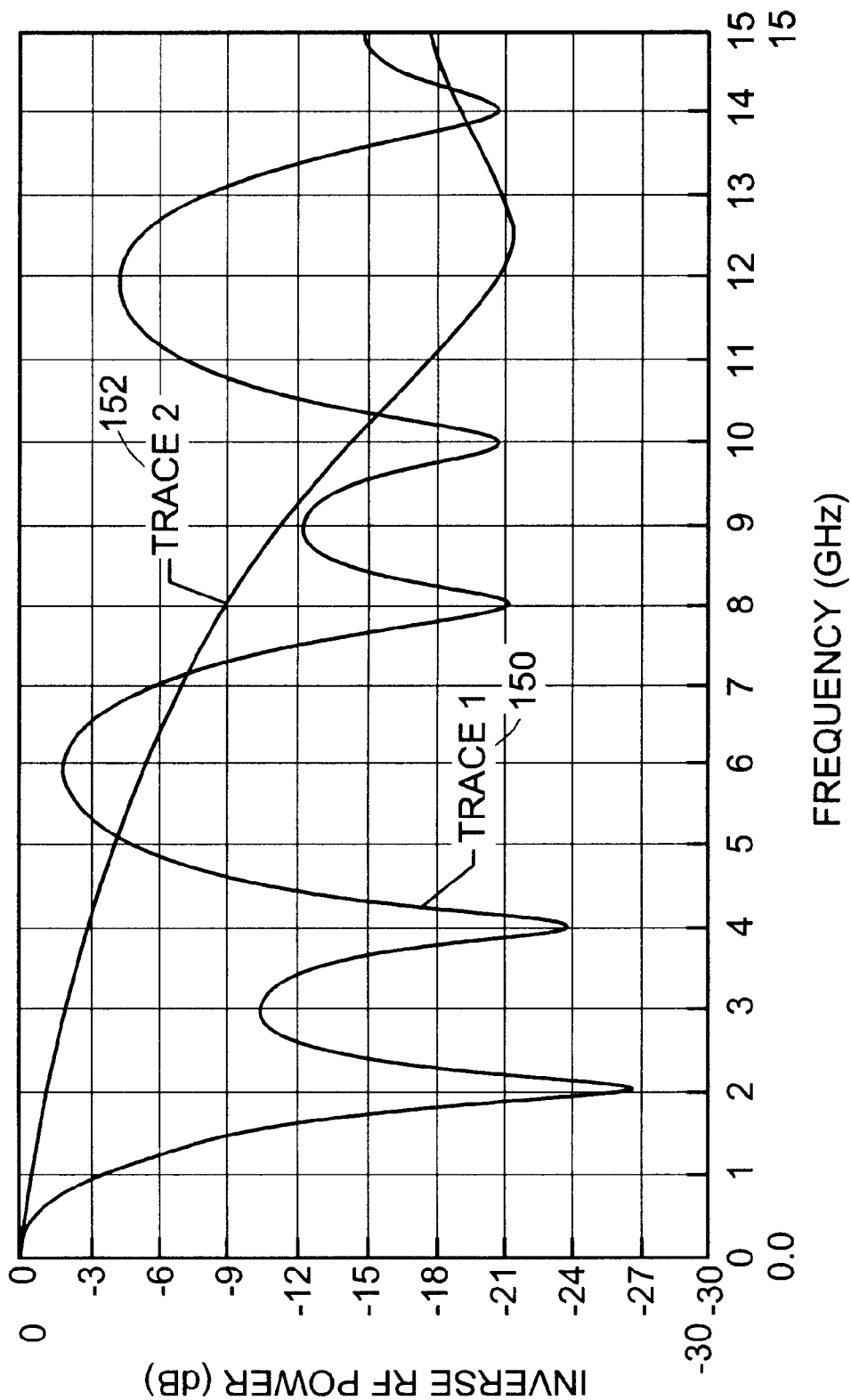
FIG. 8 presents a graph comparing the theoretical modulation efficiency for: (1) a segmented electro-optic modulator according to the present invention; and (2) for an optimized non-velocity matched prior art modulator.

FIG. 8 presents a graph comparing the theoretical modulation efficiency for: (1) a segmented electro-optic modulator according to the present invention; and (2) for an optimized non-velocity matched prior art modulator. The first trace 150 presents theoretical data for the RF power required for a certain modulation of an electro-optic modulator according to the present invention having three section separated by two compensation networks. The compensation networks were designed to modify the phase of the electrical modulation signal relative to the phase of the accumulated modulation on the optical signal so that, at the compensation point, the electrical modulation signal is substantially phase matched with the modulation on the optical signal. The second trace 152 presents theoretical data for the RF power required for a certain modulation of an optimized prior art non-velocity matched electro-optic modulator having two sections, but no compensation network.

The theoretical modulation efficiency data for both the three-section modulator according to the present invention and the prior art optimized non-velocity matched modulator were determined for identical device parameters. Both devices were optimized for 6 GHz operation. The characteristic impedance of the electrical waveguides for both devices was chosen to be 20 Ohms. The device length of both devices was chosen to be 21 mm long. The switching voltage-length product (Vpi-L) of both devices was chosen to be 50 Volt-mm. Also, the RF losses were chosen to be 0.6 dB/Sqrt-GHz for both devices. The ordinate of the graph presented in FIG. 8 plots 16–Ppi, where Ppi is the RF power required to modulate the light through pi radians. The plot is normalized to 16 dBm as the 0 dB relative point. Both the first 150 and the second trace 152 have the same reference, so that absolute modulation efficiency can be compared.

FIG. 8 shows that the segmented electro-optic modulator according to the present invention has a modulation efficiency that is at least 3 dB better than the modulation efficiency of the optimized prior art non-velocity matched electro-optic modulator at the frequency of operation. In addition, the modulation efficiency of the segmented device according to the present invention actually increases at higher operating frequencies, returning to a near optimal value at a 12 GHz operating frequency. In contrast, the modulation efficiency of the prior art modulator rapidly reduces above the operating frequency.

Figure 9:
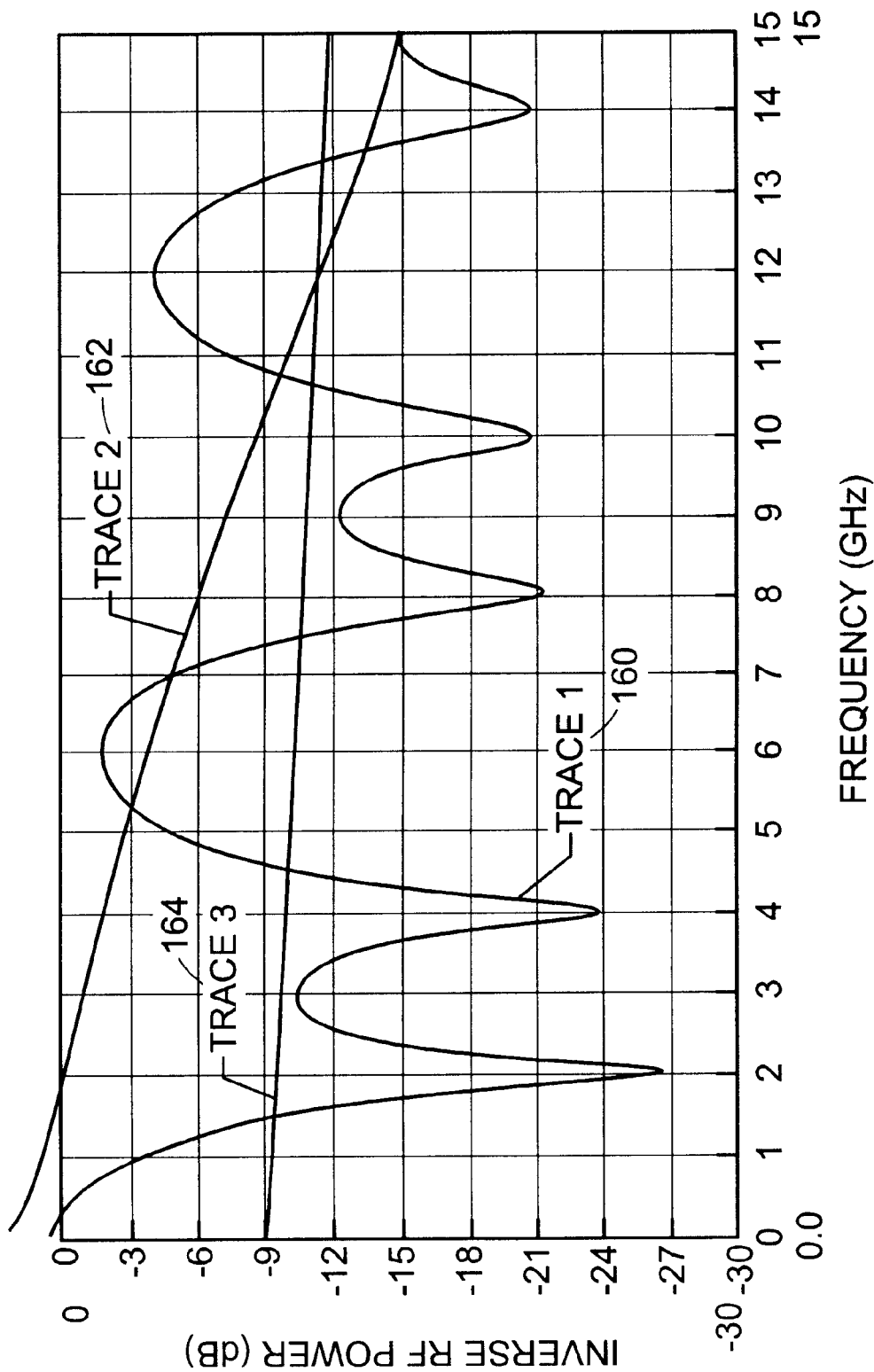
FIG. 9 presents a graph comparing the theoretical modulation efficiency of a segmented electro-optic modulator according to the present invention with two optimized velocity matched prior art modulator.

FIG. 9 presents a graph comparing the theoretical modulation efficiency for a segmented electro-optic modulator according to the present invention with two optimized velocity matched prior art modulator. The first trace 160 presents theoretical data for the modulation efficiency of the electro-optic modulator according to the present invention. The modulator has three sections separated by two compensation networks that modify the phase of the electrical modulation signal relative to the phase of the accumulated modulation on the optical signal so that, at the compensation point, the electrical modulation signal is substantially phase matched with the accumulated modulation on the optical signal. The modulator is optimized for 6 GHz operation. The device length was chosen to be 21 mm long. The switching voltage-length product (Vpi-L) was chosen to be 50 Volt-mm. The RF loss was chosen to be 0.6 dB/Sqrt-GHz. Also, the characteristic impedance was chosen to be 20 Ohms.

The second trace 162 presents theoretical data for the modulation efficiency of an optimized prior art velocity matched electro-optic modulator. The modulator was also optimized at 6 GHz. The characteristic impedance, however, was chosen to be 38 Ohms, which is typical of a velocity matched modulator. The switching voltage-length product (Vpi-L) was chosen to be 200 Volt-mm and the RF loss was chosen to be 0.5 dB/Sqrt-GHz, which is also typical of a velocity matched modulator. The device length was chosen to be 80 mm long (i.e. an arbitrarily long modulator).

The third trace 164 presents theoretical data for the modulation efficiency of another optimized prior art velocity matched electro-optic modulator. The device parameters of the modulator are identical to those described above in connection with the second trace 162 with the exception of the device length. The theoretical data presented in the third trace 164 is for a 21 mm long modulator, which is the same length as the device used in connection with the first trace 160, thus, allowing a more direct comparison of the modulator of the present invention to a prior art velocity matched modulator.

Referring to the first 160, second 162, and the third trace 164 of FIG. 9, the modulation efficiency of the modulator of the present invention that includes two compensation networks (first trace 160) has the highest modulation efficiency at the operating frequency. The modulation efficiency of the arbitrarily long length (80 mm) velocity matched modulator (second trace 162) has a modulation efficiency that is approximately 2.5 dB below the modulation efficiency of the modulator of the present invention at the frequency of operation. The modulation efficiency of the 21-mm long velocity matched modulator (third trace 164) has a modulation efficiency that is approximately 8 dB below the modulation efficiency of the modulator of the present invention at the frequency of operation.

A modulator of the present invention can be constructed in numerous ways known in the art. For example, the optical waveguides may be Ti-indiffused waveguides formed in a lithium niobate substrate. Amplitude modulation may be achieved by splitting an input waveguide into two waveguides, that recombine to form a Mach-Zehnder Interferometer (MZI). Phase modulation (PM) may be achieved by using a straight waveguide section. A Coplanar Waveguide (CPW) or Asymmetric Coplanar Waveguide (ACPW) may be used to carry the electrical signal in the optical-electrical interaction region, as well as in the compensation networks. The electrical waveguides may be terminated with a chip resistor on a ceramic substrate.

In one embodiment, the compensation networks are time delay networks that are constructed on the same substrate as the MZI lithium niobate, In another embodiment, the compensation networks are time delay networks that are constructed on a separate ceramic or lithium niobate substrate that is electrically interconnected to the lithium niobate device via wirebonds. In one embodiment, the hot and ground electrodes of the CPW and ACPW widen in the time delay sections to reduce RF loss due to the skin effect.

The compensation networks may produce an electro-optic phase change in any range. In one embodiment, the compensation networks produce electro-optic phase changes between 270 to 320 degrees. Also, any number of compensation networks can be used depending on the particular application. In one embodiment, two to five compensation networks used.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An electro-optic device comprising:
   a) an optical waveguide formed in an electro-optic substrate, the optical waveguide propagating an optical signal along a first direction of propagation;
   b) an electrical waveguide formed in the electro-optic substrate and positioned co-linear relative to the optical waveguide and in electromagnetic communication with the optical waveguide, the electrical waveguide propagating an electrical signal in the first direction of propagation; and
   c) a compensation network formed on a separate substrate, the compensation network being electrically coupled to the electrical waveguide at a junction, the compensation network propagating the electrical signal in a second direction of propagation that is substantially non-co-linear with the first direction of propagation, the compensation network modifying at least one of a phase or an amplitude of the electrical signal at the junction relative to a phase or an amplitude of the optical signal at the junction, respectively, and providing the modified electrical signal to the electrical waveguide.

2. The electro-optic device of claim 1 wherein the compensation network comprises at least one of an inductor-capacitor "Pi" network, traveling wave coupler, filter, and transmission line transformer.

3. The electro-optic device of claim 1 wherein the compensation network comprises an all-pass electrical network.

4. The electro-optic device of claim 1 wherein the compensation network comprises a time delay network.

5. The electro-optic device of claim 1 wherein the compensation network comprises a phase delay network.

6. The electro-optic device of claim 5 wherein the phase delay network modifies the phase of the electrical signal so that a magnitude of an electro-optic response of the device is increased.

7. The electro-optic device of claim 5 wherein the phase delay network modifies the phase of the electrical signal at the junction so that an electro-optic phase at the junction is substantially equal to an electro-optic phase at an input of the electrical waveguide.

8. The electro-optic device of claim 5 wherein the phase delay network modifies the phase of the electrical signal at the junction by a predetermined delay that is variable over a range from zero to one hundred and eighty degrees.

9. The electro-optic device of claim 5 wherein the phase delay network modifies the phase of the electrical signal at the junction by substantially one hundred and eighty degrees.

10. The electro-optic device of claim 1 wherein an electrical loss per unit length of the compensation network is lower than an electrical loss per unit length of the electrical waveguide.

11. The electro-optic device of claim 1 wherein the electro-optic material comprises lithium niobate.

12. The electro-optic device of claim 1 wherein the compensation network is removably attached to the electro-optic device.

13. The electro-optic device of claim 1 wherein a temperature dependence of the compensation network is inversely proportional to a temperature dependence of the electro-optic material.

14. The electro-optic device of claim 1 further comprising a broadband modulator coupled to the electro-optic device.

15. An electro-optic modulator comprising:
   a) an optical waveguide formed in an electro-optic substrate, the optical waveguide propagating an optical signal along a first direction of propagation;
   b) an electrical waveguide formed in the electro-optic substrate and positioned co-linear relative to the optical waveguide and in electromagnetic communication with the optical waveguide, the electrical waveguide propagating an electrical signal in the first direction of propagation; and
   c) a plurality of compensation networks formed on at least one separate substrate, each of the plurality of compensation networks being electrically coupled to the electrical waveguide at one of a plurality of junctions, each of the plurality of compensation networks propagating the electrical signal in a second direction of propagation that is substantially non-co-linear with the first direction of propagation, wherein
      each of the plurality of compensation networks modifies a phase of the electrical signal at a respective junction of the plurality of junctions by a predetermined delay so that a magnitude of an electro-optic response of the modulator is increased and then returns the modified electrical signal to the electrical waveguide.

16. The electro-optic modulator of claim 15 wherein each compensation network modifies the phase of the electrical signal at the respective junction so that an electro-optic phase at the junction is substantially equal to the electro-optic phase at an input of the electrical waveguide.

17. A method of modulating an optical signal, the method comprising:
   a) propagating an optical signal along an optical signal path in a first direction of propagation on a substrate;
   b) propagating an electrical modulation signal along an electrical signal path in the first direction of propagation on the substrate, the electrical signal path being substantially co-linear and in electromagnetic communication with the optical signal path;
   c) coupling the electrical signal into a substantially non-co-linear path at a compensation point of the electrical signal path, the substantially non-co-linear path being on a separate substrate;
   d) modifying at least one of a phase or an amplitude of the electrical signal at the compensation point of the electrical path by propagating the electrical signal in the substantially non-co-linear path; and
   e) coupling the modified electrical signal from the non-co-linear path into the electrical path.

18. The method of claim 17 wherein the step of modifying at least one of a phase or an amplitude of the electrical signal at the compensation point comprises the step of modifying the phase of the electrical signal at the compensation point so as to increase electro-optic response.

19. The method of claim 18 wherein the step of modifying the phase of the electrical signal at the compensation point comprises modifying the phase of the electrical signal so that an electro-optic phase at the compensation point is substantially equal to the electro-optic phase at an input of the optical signal path.

20. A method of increasing modulation efficiency, the method comprising:
   a) propagating an optical signal along an optical signal path in a first direction of propagation on a substrate;
   b) propagating an electrical modulation signal along an electrical signal path in the first direction of propagation on the substrate, the electrical signal path being substantially co-linear and in electromagnetic communication with the optical path;
   c) coupling the electrical signal into a substantially non-co-linear path at a compensation point of the electrical path, the substantially non-co-linear path being on a separate substrate, wherein the compensation point corresponds to a point where a velocity mismatch between the optical signal and the electrical signal produces a phase shift of the electrical signal relative to an accumulated modulation on the optical signal that lowers the incremental increase in modulation efficiency per unit length;
   d) modifying a phase of the electrical signal at the compensation point of the electrical path by propagating the electrical signal in the substantially non-co-linear path thereby increasing the modulation efficiency per unit length; and
   e) coupling the modified electrical signal from the non-co-linear path into the electrical path.

21. A method of broadband modulation, the method comprising:
   a) propagating an optical signal along an optical signal path in a first direction of propagation on a substrate;
   b) propagating an electrical modulation signal along an electrical signal path in the first direction of propagation on the substrate, the electrical signal path being substantially co-linear and in electromagnetic communication with the optical path,
   c) coupling the electrical signal into a substantially non-co-linear path at a compensation point of the electrical path, the substantially non-co-linear path being on a separate substrate;
   d) modifying a phase of the electrical signal at the compensation point of the electrical path relative to the phase of an accumulated modulation on the optical signal by propagating the electrical signal in the substantially non-co-linear path; and
   e) coupling the modified electrical signal from the non-co-linear path into the electrical path, thereby increasing modulation efficiency per unit length for a particular bandwidth.

22. The electro-optic device of claim 1 wherein the compensation network comprises a traveling wave structure.

23. The electro-optic device of claim 1 wherein the compensation network comprises a lumped element structure.

24. The electro-optic device of claim 1 wherein the separate substrate comprises a ceramic substrate.

25. The electro-optic device of claim 1 wherein the separate substrate comprises a lithium niobate substrate.

26. An electro-optic device comprising:
   a) an optical waveguide formed in an electro-optic material, the optical waveguide propagating an optical signal along a first direction of propagation;
   b) an electrical waveguide formed in the electro-optic material and positioned co-linear relative to the optical waveguide and in electromagnetic communication with the optical waveguide, the electrical waveguide propagating an electrical signal in the first direction of propagation; and
   c) a compensation network comprising at least one component, the compensation network being electrically coupled to the electrical waveguide at a junction, the compensation network propagating the electrical signal in a second direction of propagation that is substantially non-co-linear with the first direction of propagation, the compensation network modifying at least one of a phase or an amplitude of the electrical signal at the junction relative to a phase or an amplitude of the optical signal at the junction, respectively, and then returning the modified electrical signal to the electrical waveguide.

27. The electro-optic device of claim 26 wherein the component is a lumped element structure.

28. The electro-optic device of claim 26 wherein the component is an element selected from the group of: an inductor-capacitor "Pi" network, traveling wave coupler, filter, and transmission line transformer.

29. An electro-optic device comprising:
   a) means for propagating an optical signal along a first direction of propagation in an electro-optic substrate;
   b) means for propagating an electrical signal in the first direction of propagation in the electro-optic substrate, the means for propagating the electrical signal being co-linear relative to the means for propagating the optical signal and being in electromagnetic communication with the means for propagating the optical signal; and c) a means for modifying at least one of a phase or an amplitude of the electrical signal at a junction relative to a phase or an amplitude of the optical signal at the junction, respectively, and providing the modified electrical signal to the means for propagating the electrical signal, the means for modifying the electrical signal being disposed on a separate substrate and being electrically coupled to the means for propagating the electrical signal at the junction, the means for modifying the electrical signal being configured in a second direction of propagation that is substantially non-co-linear with the first direction of propagation.

* * * * *